F. W. TALLY.
MIXING-VESSELS FOR BEVERAGES.

No. 174,746. Patented March 14, 1876.

Witnesses:

Inventor
Felix W. Tally
By Connolly Bros
Attorney

UNITED STATES PATENT OFFICE.

FELIX W. TALLY, OF PHILADELPHIA, PENNSYLVANIA, ASSIGNOR OF ONE-HALF HIS RIGHT TO JAMES B. ROBERTS, OF SAME PLACE.

IMPROVEMENT IN MIXING-VESSELS FOR BEVERAGES.

Specification forming part of Letters Patent No. 174,746, dated March 14, 1876; application filed July 26, 1875.

*To all whom it may concern:*

Be it known that I, FELIX W. TALLY, of Philadelphia, in the county of Philadelphia and State of Pennsylvania, have invented certain new and useful Improvements in Mixing-Vessels for Beverages; and I do hereby declare the following to be a full, clear, and exact description of the invention, such as will enable others skilled in the art to which it pertains to make and use it, reference being had to the accompanying drawings, which form part of this specification, in which—

Figure 1:
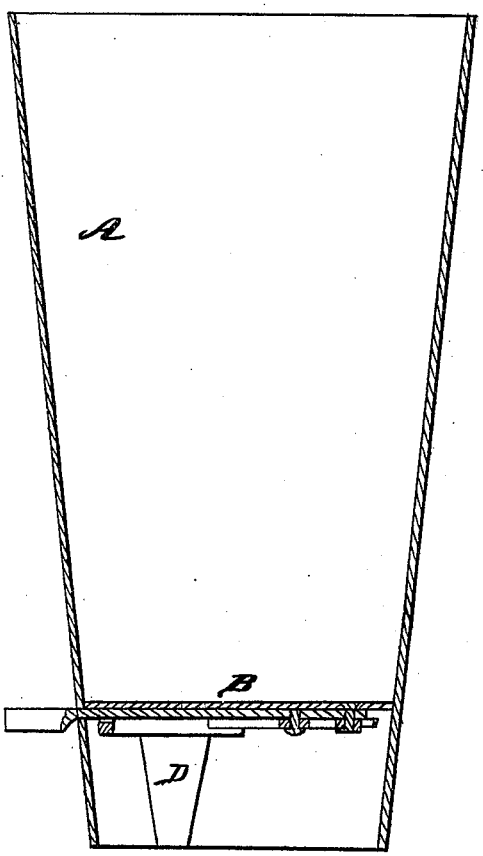
Figure 2:
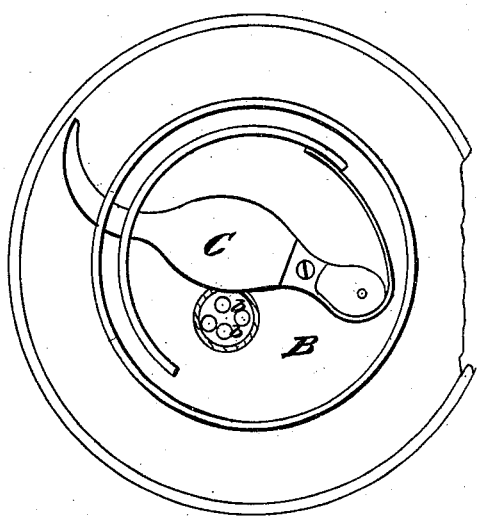

Figure 1 is a vertical central section, and Fig. 2 a bottom view.

My invention consists in forming the "shaker" usually employed in bar-rooms and saloons for agitating mixed drinks with a bottom through which the liquids may be strained, leaving the solid matter or residuum in said shaker.

In carrying my invention into effect, I form the bottom of the shaker with a number of holes covered by a cut-off or equivalent valve. As soon as the drink to be mixed has been shaken, this valve is opened and the liquid portion drawn off, the solid matter or residuum being left in the shaker, to be thrown away or otherwise disposed of.

Referring to the accompanying drawing, A shows a shaker, having a suitable strainer, composed of holes or otherwise, formed in the bottom; B, the openings in which, shown at $b\,b$, which are closed by a cut-off or other valve, C. D is a spout attached to C and communicating with holes $b\,b$, and rendering the vessel serviceable as a funnel.

I claim—

1. As a new article of manufacture, a combined mixer and strainer for fancy drinks, consisting of the mixing-cup A, of ordinary shape, having a strainer in the bottom, with a valve to close and open the same, substantially as described.

2. The funnel-spout D, in combination with a mixer and strainer, consisting of the cup A, having a strainer in the bottom, with a valve to open and close the same, substantially as described.

Witness my hand this 21st day of June, A. D. 1875.

FELIX W. TALLY.

Witnesses:
S. J. VAN STAVOREN,
CHAS. F. VAN HORN.